United States Patent
Larsson et al.

(10) Patent No.: US 7,970,400 B2
(45) Date of Patent: Jun. 28, 2011

(54) CONNECTION TYPE HANDOVER OF VOICE OVER INTERNET PROTOCOL CALL BASED ON RESOURCE TYPE

(75) Inventors: Anders Larsson, Stockholm (SE); Martin Backstrom, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1207 days.

(21) Appl. No.: 11/298,939

(22) Filed: Dec. 12, 2005

(65) Prior Publication Data

US 2006/0268849 A1 Nov. 30, 2006

Related U.S. Application Data

(60) Provisional application No. 60/684,216, filed on May 25, 2005, provisional application No. 60/684,214, filed on May 25, 2005, provisional application No. 60/684,215, filed on May 25, 2005, provisional application No. 60/684,232, filed on May 25, 2005, provisional application No. 60/684,188, filed on May 25, 2005, provisional application No. 60/684,233, filed on May 25, 2005.

(51) Int. Cl.
  *H04W 36/00* (2009.01)
  *H04B 1/00* (2006.01)
(52) U.S. Cl. .......................................... 455/436; 375/132
(58) Field of Classification Search .................. 370/328, 370/352–356; 455/452.1–452.2; 375/66, 375/132
See application file for complete search history.

(56) References Cited

U.S. PATENT DOCUMENTS

| | | | |
|---|---|---|---|
| 5,774,808 A * | 6/1998 | Sarkioja et al. | 455/436 |
| 5,987,032 A | 11/1999 | Nadgauda et al. | |
| 6,282,192 B1 | 8/2001 | Murphy et al. | |
| 6,466,794 B1 * | 10/2002 | Posti et al. | 455/450 |
| 6,493,541 B1 | 12/2002 | Gunnarsson et al. | |

(Continued)

FOREIGN PATENT DOCUMENTS

WO 03/019961 A1 3/2003

OTHER PUBLICATIONS

3GPP TR 23.806 V1.7.0 (Nov. 2005), Technical Specification Group Service and System Aspects; Voice Call Continuity between CS and IMS Study (Release 7).

(Continued)

*Primary Examiner* — Curtis Kuntz
*Assistant Examiner* — Mohammad K Islam
(74) *Attorney, Agent, or Firm* — Nixon & Vanderhye, P.C.

(57) ABSTRACT

A telecommunications network comprises a base station node (28) which provides plural sets of radio transmission resources (52) for communicating with mobile stations (30) in a cell (40). At least one set ($52_1$) of radio transmission resources of the cell is a non-hopping set of radio transmission resources including a resource which may carry the BCCH, and other sets ($52_1$-$52_n$) of radio transmission resources of the cell are hopping sets of radio transmission resources. A base station controller (26) node schedules calls comprising voice over internet protocol packet flows on the non-hopping sets of radio transmission resources in accordance with capacity of the non-hopping set of radio transmission resources. When the non-hopping set of radio transmission resources lacks capacity for a further call with a mobile station, the base station controller (26) node requests that the call be changed from a voice over internet protocol packet flow to a circuit switched connection.

32 Claims, 8 Drawing Sheets

U.S. PATENT DOCUMENTS

| | | | |
|---|---|---|---|
| 6,590,928 B1 | 7/2003 | Haartsen | |
| 6,757,542 B2 | 6/2004 | Bruin et al. | |
| 6,778,831 B1* | 8/2004 | Sancho et al. | 455/436 |
| 6,804,217 B1* | 10/2004 | Miyatani et al. | 370/335 |
| 6,845,123 B1 | 1/2005 | Nyberg et al. | |
| 6,868,080 B1 | 3/2005 | Umansky et al. | |
| 6,882,847 B2 | 4/2005 | Craig et al. | |
| 7,200,125 B2 | 4/2007 | Lohtia et al. | |
| 7,239,861 B2 | 7/2007 | Holur | |
| 7,336,957 B2* | 2/2008 | Marinier et al. | 455/450 |
| 7,580,424 B2 | 8/2009 | Ravishankar et al. | |
| 2001/0049790 A1 | 12/2001 | Faccin et al. | |
| 2002/0078214 A1 | 6/2002 | Shindou et al. | |
| 2002/0122406 A1 | 9/2002 | Chillariga et al. | |
| 2002/0145988 A1 | 10/2002 | Dahlman et al. | |
| 2002/0172163 A1 | 11/2002 | Chen et al. | |
| 2002/0181422 A1 | 12/2002 | Parantainen et al. | |
| 2003/0026245 A1 | 2/2003 | Ejzak | |
| 2003/0095542 A1* | 5/2003 | Chang et al. | 370/352 |
| 2003/0128694 A1 | 7/2003 | Hundscheidt et al. | |
| 2003/0156557 A1 | 8/2003 | Kalden et al. | |
| 2004/0057378 A1* | 3/2004 | Gronberg | 370/230 |
| 2004/0085949 A1 | 5/2004 | Partanen et al. | |
| 2004/0141572 A1 | 7/2004 | Johnson et al. | |
| 2004/0203727 A1* | 10/2004 | Abiri et al. | 455/423 |
| 2004/0246990 A1* | 12/2004 | Krishnamurthi et al. | 370/466 |
| 2005/0047396 A1* | 3/2005 | Helm et al. | 370/352 |
| 2005/0195762 A1 | 9/2005 | Longoni et al. | |
| 2006/0050680 A1 | 3/2006 | Naim et al. | |
| 2006/0140113 A1 | 6/2006 | Anderlind et al. | |
| 2006/0142011 A1 | 6/2006 | Kallio | |
| 2006/0211437 A1 | 9/2006 | Yang | |
| 2006/0250957 A1 | 11/2006 | Gielty et al. | |
| 2006/0268813 A1 | 11/2006 | Larsson et al. | |
| 2006/0268837 A1 | 11/2006 | Larsson et al. | |
| 2006/0268838 A1 | 11/2006 | Larsson et al. | |
| 2006/0268848 A1 | 11/2006 | Larsson et al. | |
| 2006/0268900 A1 | 11/2006 | Larsson et al. | |
| 2007/0083470 A1 | 4/2007 | Bonner et al. | |

OTHER PUBLICATIONS

Hamidian, K., et al. "Performance Analysis of a CDMA/FDMA Cellular Communication System with Cell Splitting," IEEE, 1997, pp. 545-550.

Kim, Won, S., et al., "Enhanced Capacity in CDMA Systems with Alternate Frequency Planning," IEEE, 1998, pp. 973-978.

Kang et al, "Adaptive QoS Control by Toggling Voice Traffic Between Circuit and Packet Cellular Networks", GLOBECOM 2003, IEEE Global Telecommunications Conference, Conference Proceedings, San Francisco, Dec. 1-5, 2003, New York, NY, IEEE publ. 2003-I2-01, vol. 7, pp. 3498-3503.

International Search Report and Written Opinion mailed Oct. 10, 2006 in corresponding PCT application No. PCT/SE2006/050124.

U.S. Office Action mailed May 29, 2009 in related U.S. Appl. No. 11/298,938.

U.S. Office Action mailed Jan. 30, 2009 in related U.S. Appl. No. 11/288,436.

International Search Report and Written Opinion mailed Nov. 9, 2006 in PCT application No. PCT/SE2006/050144.

Liebl et al, "Enhanced Packet-Based Transmission of Multi-Rate Signals Over Geran", Personal, Indoor and Mobile Radio Communications, 2004, PIMRC 2004, 15th IEEE Inter'. Symposium, Sep. 5-8, 2004, vol. 3, pp. 1812-1816.

U.S. Office Action mailed Mar. 19, 2009 in related U.S. Appl. No. 11/370,171.

U.S. Office Action mailed Aug. 21, 2008 in related U.S. Appl. No. 11/370,171.

3GPP TS 23.228 V7.1.0 (Sep. 2005), 3rd Generation Partnership Project; Technical Specification Group Services and System Aspects; IP Multimedia Subsystem (IMS); Stage 2 (Release 7).

3GPP TS 24.228 V5.13.0 (Jun. 2005), 3rd Generation Partnership Project; Technical Specification Group Core Network and Terminals; Signalling flows for the IP multimedia call control based on Session Initiation Protocol (SIP) and Session Description Protocol (SDP); Stage 3 (Release 5).

3GPP TS 24.229 V7.1.1 (Oct. 2005), 3rd Generation Partnership Project; Technical Specification Group Core Network and Terminals; IP Multimedia Call Control based on Session Initiation Protocol (SIP) and Session Description Protocol (SDP); Stage 3 (Release 7).

3GPP TR 22.941 V0.7.7 (Nov. 2001), 3rd Generation Partnership Project; Technical Specification Group Services and System Aspects; IP Based Multimedia Services Framework; Stage 0 (Release 5).

3GPP TS 32.225 V5.9.0 (Sep. 2005), 3rd Generation Partnership Project; Technical Specification Group Service and System Aspects; Telecommunication Management; Charging Management; Charging Data Description for IP Multimedia Subsystem (IMS) (Release 5).

3GPP TS 22.340 V6.2.0 (Mar. 2005), 3rd Generation Partnership Project; Technical Specification Group Service and System Aspects; IP Multimedia System (IMS) Messaging; Stage 1 (Release 6).

3GPP TS 29.228 V6.8.0. (Sep. 2005), 3rd Generation Partnership Project; Technical Specification Group Core Network and Terminals; IP Multimedia (IM) Subsystem Cx and Dx interfaces; Signalling flows and message contents (Release 6).

3GPP TS 22.250 V6.0.0 (Dec. 2002), 3rd Generation Partnership Project; Technical Specification Group Services and System Aspects; IP Multimedia Subsystem (IMS) group management; Stage 1 (Release 6).

3GPP Ts 26.141 V6.1.0 (Mar. 2005), 3rd Generation Partnership Project; Technical Specification Group Services and System Aspects; IP Multimedia System (IMS) Messaging and Presence; Media formats and codecs (Release 6).

3GPP TS 23.060 V5.2.0 (Jun. 2002); 3rd Generation Partnership Project; Technical Specification Group Services and System Aspects; General Packet Radio Service (GPRS); Service description; Stage 2 (Release 5); http://www.3gpp.org.

SIM Access; http://www.eurescom.; pp. 1-11.

Office Action mailed Dec. 24, 2009 in co-pending U.S. Appl. No. 11/298,938.

Office Action mailed Nov. 3, 2009 in co-pending U.S. Appl. No. 11/370,171.

Office Action mailed Mar. 24, 2010 in co-pending U.S. Appl. No. 11/314,973.

Office Action mailed Oct. 30, 2009 in co-pending U.S. Appl. No. 11/288,436.

Ericsson White Paper; "IMS—IP Multimedia Subsystem—The Value of Using the IMS Architecture", Oct. 2004.

* cited by examiner

CONNECTION TYPE HANDOVER OF VOICE OVER INTERNET PROTOCOL CALL BASED ON RESOURCE TYPE

This application claims the benefit and priority of U.S. Provisional Patent Application 60/684,216, filed May 25, 2005, the entire contents of which is incorporated by reference in its entirety.

This application is related to simultaneously-filed U.S. patent application Ser. No. 11/298,938, entitled "CONNECTION TYPE HANDOVER OF VOICE OVER INTERNET PROTOCOL CALL BASED LOW-QUALITY DETECTION", which is also incorporated by reference in its entirety.

This application is related to U.S. patent application Ser. No. 11/288,436, filed Nov. 29, 2005, entitled "SCHDULING RADIO RESOURCES FOR SYMMETRIC SERVICE DATA CONNECTIONS", which is also incorporated by reference in its entirety.

This application is also related to the following related US Provisional patent applications, all of which are also incorporated by reference in their entirety:

U.S. Provisional Patent Application 60/684,214 entitled "GSM VoIP PS-to-CS Handover at Low-Quality Detection," filed on May 25, 2005;

U.S. Provisional Patent Application 60/684,215 entitled "Local Switching AGC," filed on May 25, 2005;

U.S. Provisional Patent Application 60/684,232 entitled "Method to Improve VoIP Media Flow Quality by Adapting Speech Encoder and LQC Based on EDGE MCS;

U.S. Provisional Patent Application 60/684,188, filed May 25, 2005;

U.S. Provisional Patent Application 60/684,233 entitled "Authenticated Identification of VoIP Flow in BSS," filed on May 25, 2005.

BACKGROUND

1. Technical Field

The present invention pertains to telecommunications, and particularly to Voice over Internet Protocol (VoIP).

2. Related Art and Other Considerations

Voice over Internet Protocol (VoIP) in the mobile world means using a packet switched (PS) service for transport of Internet Protocol (IP) packets (which contain, e.g., Adaptive Mutli-Rate codec (AMR) speech frames) for normal mobile phone calls. In circuit-switched networks, network resources are static from the sender to receiver before the start of the transfer, thus creating a "circuit". The resources remain dedicated to the circuit during the entire transfer and the entire message follows the same path. In packet-switched networks, the message is broken into packets, each of which can take a different route to the destination where the packets are recompiled into the original message.

The packet switched (PS) service utilized for VoIP can be, for example, GPRS (General Packet Radio Service), EDGE (Enhanced Data Rates for Global Evolution), or WCDMA (Wideband Code Division Multiple Access). Each of these example services happen to be built upon the Global System for Mobile communications (GSM), a second generation ("2G") digital radio access technology originally developed for Europe. GSM was enhanced in 2.5G to include technologies such as GPRS. The third generation (3G) comprises mobile telephone technologies covered by the International Telecommunications Union (ITU) IMT-2000 family. The Third Generation Partnership Project (3GPP) is a group of international standards bodies, operators, and vendors working toward standardizing WCDMA-based members of the IMT-2000.

EDGE (or Enhanced Data Rates for Global Evolution) is a 3G technology that delivers broadband-like data speeds to mobile devices. EDGE allows consumers to connect to the Internet and send and receive data, including digital images, web pages and photographs, three times faster than possible with an ordinary GSM/GPRS network. EDGE enables GSM operators to offer higher-speed mobile-data access, serve more mobile-data customers, and free up GSM network capacity to accommodate additional voice traffic.

EDGE provides three times the data capacity of GPRS. Using EDGE, operators can handle three times more subscribers than GPRS; triple their data rate per subscriber, or add extra capacity to their voice communications. EDGE uses the same TDMA (Time Division Multiple Access) frame structure, logic channel and 200 kHz carrier bandwidth as GSM networks, which allows existing cell plans to remain intact.

In EDGE technology, a base transceiver station (BTS) communicates with a mobile station (e.g., a cell phone, mobile terminal or the like, including computers such as laptops with mobile termination). The base transceiver station (BTS) typically has plural transceivers (TRX), with each transceiver having plural timeslots. Some of the transceivers (TRX) are capable of "hopping", e.g., frequency hopping. Frequency hopping is a process in which the data signal is modulated with a narrowband carrier signal that "hops" in a random but predictable sequence from frequency to frequency as a function of time over a wide band of frequencies. In GSM a channel such as the broadcast control channel (BCCH) must (in practice) be on a non-hopping transceiver.

A typical GSM network cell configuration has one of the transceivers of a base transceiver station (BTS) configured as non-hopping, and puts the BCCH on the non-hopping transceiver. As the BCCH must be configured with a low frequency reuse, the whole transceiver gets a very good carrier to interference ratio C/I. The rest of the non-hopping transceiver (e.g., the remaining 6-7 timeslots of the non-hopping transceiver) can be configured (as available) for EDGE. These non-hopping transceiver timeslots will (thanks to the good C/I) provide very high bitrate, as the bitrate in EDGE varies depending on the C/I.

Figure 5:
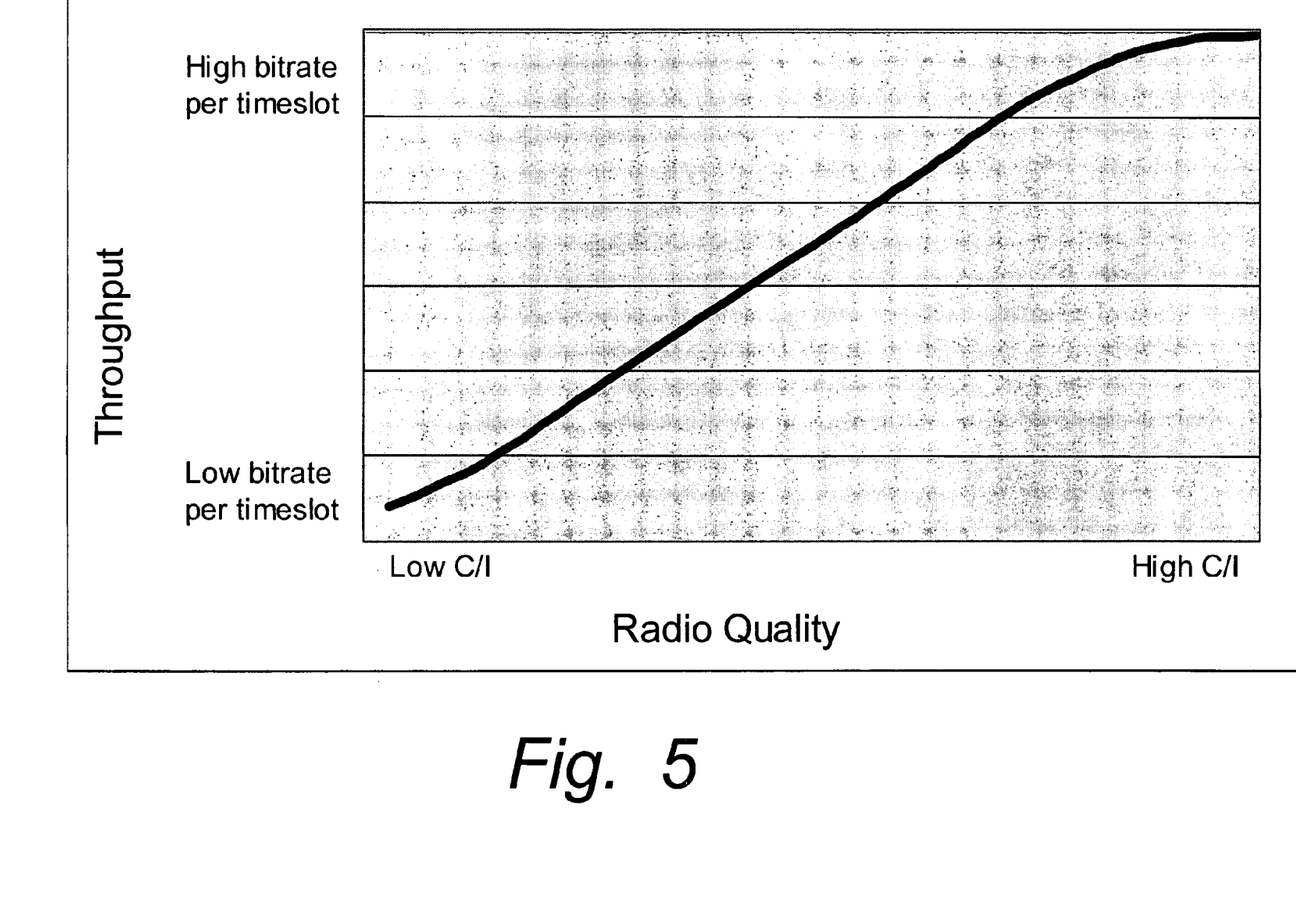
FIG. 5 is a graph depicting throughput (bitrate) as a function of radio quality (C/I).

The other transceivers in the cell are typically configured as hopping and planned with a very tight reuse for maximum network capacity from the available frequency spectrum. These timeslots will (due to the lower C/I) provide much lower bitrate per timeslot since (as stated before) the bitrate in EDGE varies depending on C/I. FIG. 5 shows generally throughput (bitrate) as being a function of radio quality (C/I).

VoIP may be more hardware efficient than a circuit switched CS connection on the non-hopping transceiver with the BCCH. Such efficiency advantage is a result of the higher C/I for which the BCCH transmitter is frequency planned via, e.g., frequency reuse (e.g., greater distance between cells using the same frequency). For example, more users could be served on a same number of timeslots as compared to circuit switched connections. However, a significant problem can develop in that VoIP may be less hardware efficient than CS on the hopping TRXs as a result of the lower radio quality (C/I) of the hopping TRXsSo, while VoIP may be beneficial on one (non-hopping) transceiver of a base transceiver station (BTS), VoIP may not be beneficial on another (hopping) transceiver.

In the early or introductory days of VoIP, it is expected that many users will upgrade from an old circuit switched phone to a VoIP phone. It is likely that each such upgrading user will bring a benefit for the operator in terms of increased hardware efficiency. But eventually at a certain VoIP penetration, each user upgrading from an old circuit switched phone to a VoIP phone will bring a penalty to the operator in terms of decreased hardware efficiency.

SUMMARY

A telecommunications network comprises a base station node which provides plural sets of radio transmission resources for communicating with mobile stations in a cell. At least one set of radio transmission resources of the cell is a non-hopping set of radio transmission resources and other sets of radio transmission resources of the cell are hopping sets of radio transmission resources. A packet control unit schedules calls comprising voice over internet protocol packet flows on the non-hopping sets of radio transmission resources in accordance with capacity of the non-hopping set of radio transmission resources. When the non-hopping set of radio transmission resources lacks capacity for a further call with a mobile station, the packet control unit requests that the call be changed from a voice over internet protocol packet flow to a circuit switched connection. The packet control unit can be located either entirely or partially at any suitable network node, such as at a base station control (BSC) node, the base station node, and a GPRS Support node (GSN).

A method of operating a telecommunications network comprises configuring at least one set of radio transmission resources of a cell as a non-hopping set of radio transmission resources. Voice over internet protocol packet flows are scheduled on the non-hopping set of radio transmission resources in accordance with capacity of the non-hopping set of radio transmission resources. When the non-hopping set of radio transmission resources lacks capacity for a further call with a mobile station, the further call is changed from a voice over internet protocol packet flow to a circuit switched connection.

As another aspect, a method of operating a telecommunications network comprises configuring a transmitter with radio transmission resources including at least one radio transmission resource for a broadcast control channel (BCCH); scheduling calls comprising voice over internet protocol packet flows on the radio transmission resources of the transmitter in accordance with capacity of the transmitter; and, when the transmitter having the radio transmission resource for the broadcast control channel (BCCH) lacks capacity for a further call with a mobile station, requesting that the further call be changed from a voice over internet protocol packet flow to a circuit switched connection. The radio transmission resources of the transmitter can be, for example, non-hopping resources, in which case the method may further comprise utilizing at least one timeslot of the non-hopping radio transmission resources for the broadcast control channel (BCCH), and using other timeslots of the non-hopping radio transmission resources for the calls comprising voice over internet protocol packet flows. Requesting that the further call be changed from the voice over internet protocol packet flow to the circuit switched connection can comprise requesting that the mobile station to perform a packet-switch to circuit-switch handover and thereby reattach the call as a circuit switch call other radio transmission resources (e.g., hopping radio transmission resources of other transmitters serving the same cell).

In an illustrated, non-limiting example embodiment, the non-hopping set of radio transmission resources comprise radio transmission resources provided by a non-hopping transceiver and the radio transmission resources provided by the non-hopping transceiver comprise timeslots on a frequency upon which the non-hopping transceiver operates. Similarly, the hopping sets of radio transmission resources comprise radio transmission resources provided by respective hopping transceivers and the radio transmission resources provided by the hopping transceivers comprise timeslots on respective frequencies upon which the hopping transceivers operate.

In an example implementation, at least one radio transmission resource of the non-hopping set of radio transmission resources can be utilized for a BCCH, while other radio transmission resources of the non-hopping set of radio transmission resources can be utilized for the calls comprising voice over internet protocol packet flows. For example, at least one timeslot of the non-hopping set of radio transmission resources can be utilized for a BCCH, and other timeslots of the non-hopping set of is radio transmission resources can be utilized for the calls comprising voice over internet protocol packet flows.

In an example embodiment, the step of requesting that the mobile station change the call from a voice over internet protocol packet flow to the circuit switched connection can comprise requesting the mobile station to perform a packet-switch to circuit-switch handover and thereby reattach the call as a circuit switch call on one of the hopping sets of radio transmission resources of the cell.

In an example implementation, the calls comprising voice over internet protocol packet flows are EDGE VoIP flows. Preferably, but not necessarily, the hopping sets of radio transmission resources have higher reuse among other cells of the network than the non-hopping set of radio transmission resources.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicity shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
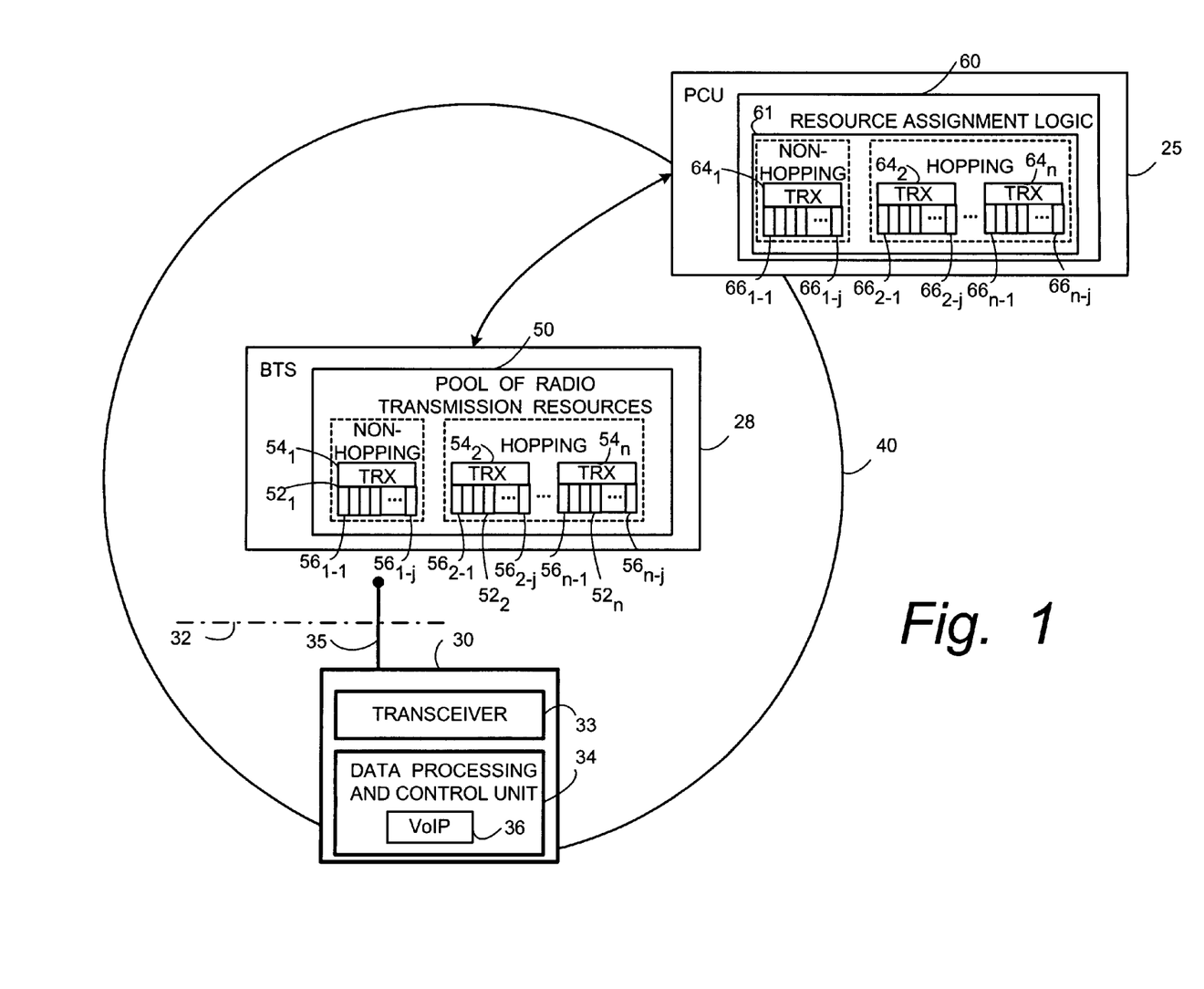
FIG. 1 is a simplified function block diagram of a portion of a generic network including portions of a mobile station (MS), portions of a base transceiver station (BTS), and portions of a packet control unit (PCU).

FIG. 1 shows a portion of a generic network including portions of a packet control unit (PCU) 25 and portions of a base transceiver station (BTS) 28, as well as a mobile station (MS) 30 in radio frequency communication over an air interface 32 with base transceiver station (BTS) 28. The mobile station (MS) 30 includes a transceiver 33 and a data processing and control unit 34. Included in data processing and control unit 34 are functionalities for providing a voice over Internet Protocol (VoIP) capability, e.g., VoIP application 36. The person skilled in the art will recognize that mobile station (MS) 30 and data processing and control unit 34 in particular typically includes numerous other functionalities and applications, as well as unillustrated input/output devices such as a screen, keypad, and the like.

The base transceiver station (BTS) 28 serves one or more cells, such as cell 40. In serving cell 40, base transceiver station (BTS) 28 provides a pool 50 of radio transmission resources. As conceptualized in an example embodiment of FIG. 1, pool 50 comprises plural sets $52_1$-$52_n$ of radio transmission resources for communicating with mobile stations in cell 40. At least one set of radio transmission resources of the cell is a non-hopping set of radio transmission resources. For example, in the implementation of FIG. 1 set $52_1$ is a non-hopping set of radio transmission resources. Other sets of radio transmission resources of the cell, such as sets $52_2$-$52_n$ are hopping sets of radio transmission resources.

In an illustrated, non-limiting example implementation of the FIG. 1 embodiment, the non-hopping set $52_1$ of radio transmission resources comprise radio transmission resources provided by a non-hopping transceiver $54_1$. The radio transmission resources provided by the non-hopping transceiver $54_1$ comprise timeslots $56_{1-1}$ through $56_{1-j}$ on a frequency upon which the non-hopping transceiver $54_1$ operates. Similarly, the hopping sets $52_2$-$52_n$ of radio transmission resources comprise radio transmission resources provided by respective hopping transceivers $54_2$-$52_1$ and the radio transmission resources provided by the hopping transceivers comprise timeslots on respective frequencies upon which the hopping transceivers operate. For example, the radio transmission resources provided by hopping transceiver $54_2$ comprise timeslots $56_{2-1}$ through $56_{2-j}$; the radio transmission resources provided by hopping transceiver $54_3$ comprise timeslots $56_{3-1}$ through $56_{3-j}$; and so forth.

Optionally in the foregoing example implementation, at least one radio transmission resource of the non-hopping set $52_1$ of radio transmission resources can be utilized for a broadcast control channel (BCCH) (and/or for other standardized or common broadcast channels), while other radio transmission resources of the non-hopping set $52_1$ of radio transmission resources can be utilized for calls comprising voice over internet protocol packet flows. For example, at least one timeslot of the non-hopping set $52_1$ of radio transmission resources can be utilized for a BCCH (such as timeslots $56_{1-1}$, for example), and other timeslots of the non-hopping set $52_1$ of radio transmission resources (such as timeslots $56_{1-2}$ through $56_{1-j}$, for example) can be utilized for the calls comprising voice over internet protocol packet flows.

The packet control unit (PCU) 25 comprises resource assignment logic, which can be implemented (for example) by a resource assignment controller 60. In an example embodiment, resource assignment logic controller 60 schedules calls which take the form of voice over internet protocol packet flows in the method and/or manner of FIG. 2.

Figure 2:
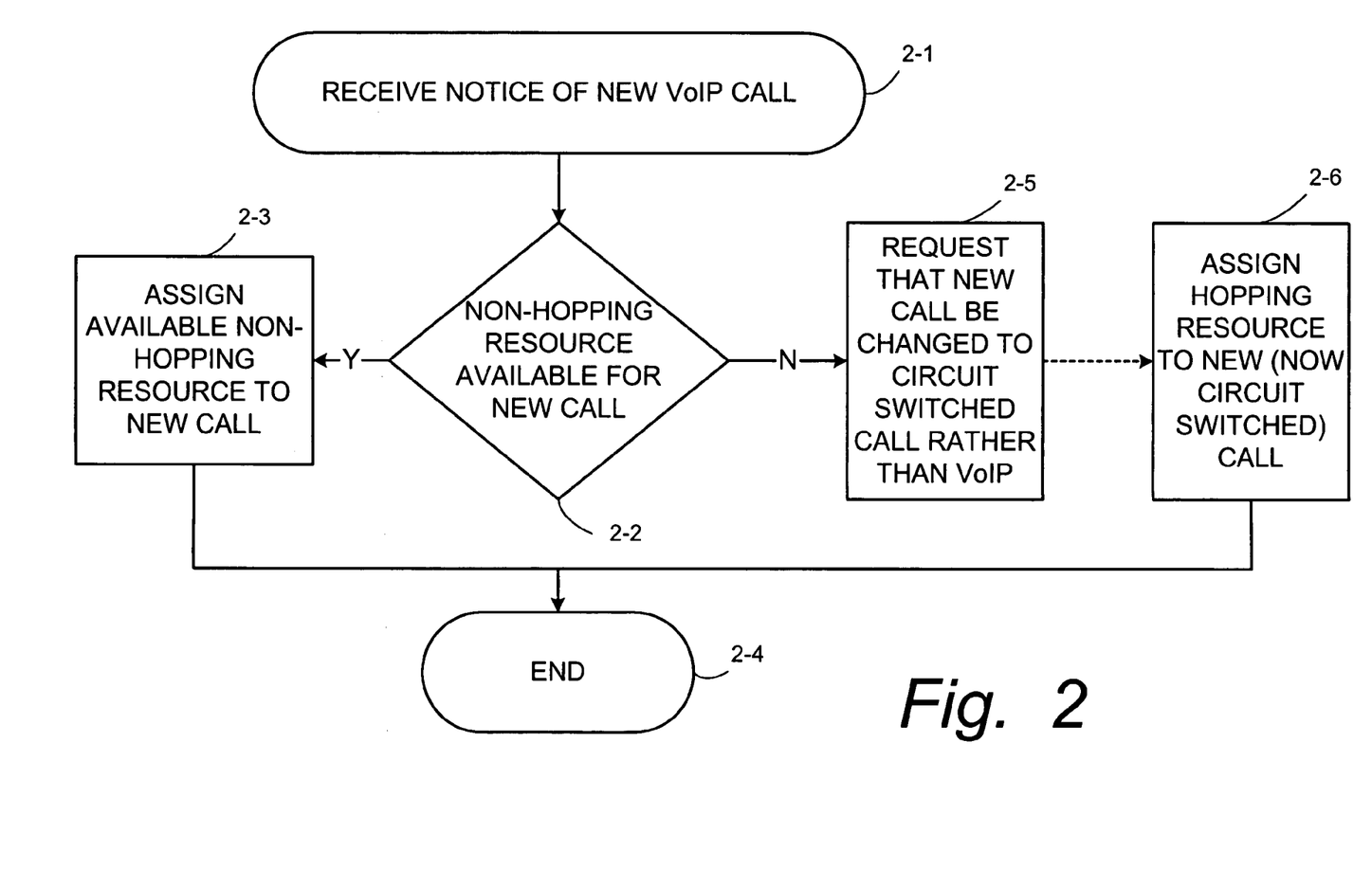
FIG. 2 is a flowchart showing basic, example, representative, non-limiting steps or actions performed by resource assignment controller of a base station controller (BSC).

FIG. 2 shows basic, example, representative, non-limiting steps or actions performed by resource assignment controller 60 of packet control unit (25). Act 2-1 shows resource assignment controller 60 being notified of a new call which does or intends to use voice over internet protocol packet flow(s). The notification may apprise resource assignment controller 60 that the call is being requested or actually setup. Upon receipt of such notification, as act 2-2 the resource assignment controller 60 checks whether capacity currently exist on one of the non-hopping sets of radio transmission resources for carrying the new call. In other words, resource assignment controller 60 determines whether any non-hopping resource is currently available for allocation to the new call. In the example implementation of FIG. 1, for example, as act 2-2 the resource assignment controller 60 checks whether any of the timeslots 56 of non-hopping transceiver $54_1$ are available to allocate to the new call.

For its assignment and allocation of resources, resource assignment controller 60 may include a resource memory 61 or other mechanism for keeping track of allocation or assignment of resources of the sets 52 of radio transmission resources provided by base transceiver station (BTS) 28. The resource memory 61 may resemble a map or image of the sets 52 of radio transmission resources. For example, as shown in FIG. 1, the memory or map 51 may contain a transceiver information element 64 corresponding to each transceiver 54 and a timeslot information element 66 corresponding to each timeslot 56. As further example of such correspondence, timeslot information element $66_{1\text{-}2}$ corresponds to timeslot $56_{1\text{-}2}$ of set $52_1$ of the radio transmission resources provided by transceiver $54_1$; timeslot information element $66_{1\text{-}3}$ corresponds to timeslot $56_{1\text{-}3}$ of set $52_1$ of the radio transmission resources provided by transceiver $54_1$; timeslot information element $66_{2\text{-}1}$ corresponds to timeslot $56_{2\text{-}1}$ of set $52_2$ of the radio transmission resources provided by transceiver $54_2$; and so forth.

If the check act 2-2 indicates that the non-hopping resource has capacity, as act 2-3 the resource assignment controller 60 assigns an available non-hopping resource to the new call. Included in act 2-3 is the resource assignment controller 60 updating (e.g., in its resource memory 61) the timeslot information element corresponding to the non-hopping resource assigned to the new call. The resource assignment controller 60 can then end its processing aspects involved in setup of the new call, as indicated by act 2-4. Of course, upon completion or breakdown of the call, the resource memory 61 will need again to be updated to reflect the timeslot again becoming available.

When the non-hopping set of radio transmission resources lacks capacity for a further call with a mobile station, as act 2-5 the resource assignment controller 60 prompts packet control unit (25) to request that the call be changed from a voice over internet protocol packet flow to a circuit switched connection. Such request can be implemented, for example, by requesting that the mobile station (MS) 30 change the call from a voice over internet protocol packet flow to a circuit switched connection.

Assuming that, in response to the request of act 2-5, the new call is switched to a circuit switch call rather than a VoIP call, eventually as act 2-6 the resource assignment controller 60 assigns a hopping radio transmission resource to the new (now circuit switched call). Assignment or reallocation of a call to a circuit switch call is understood by the person skilled in the art and is described, e.g., by 3GPP TR 23.806 V1.7.0 (2005-11), Technical Specification Group Service and System Aspects; Voice Call Continuity between CS and IMS Study (Release 7), e.g., section 6.3.6, all incorporated herein by reference. The resource assignment controller 60 can then end its processing aspects involved in setup of the new call, as indicated by act 2-4. As mentioned previously, upon completion or breakdown of the call, the resource memory 61 will need again to be updated to reflect the hopping resource becoming available.

Thus, encompassed hereby is a method of operating a telecommunications network which comprises configuring at least one set of radio transmission resources of a cell as a non-hopping set of radio transmission resources. Voice over internet protocol packet flows are scheduled on the non-hopping set of radio transmission resources in accordance with capacity of the non-hopping set of radio transmission resources. When the non-hopping set of radio transmission resources lacks capacity for a further call with a mobile station, the call is changed from a voice over internet protocol packet flow to a circuit switched connection.

In an example embodiment, the step of requesting that the mobile station change the call from a voice over internet protocol packet flow to the circuit switched connection can comprise requesting the mobile station to perform a packet-switch to circuit-switch handover and thereby reattach the call as a circuit switch call on one of the hopping sets of radio transmission resources of the cell.

Preferably, but not necessarily, the hopping sets of radio transmission resources have higher reuse among other cells of the network than the non-hopping set of radio transmission resources. Frequency reuse is known to the person skilled in the art and understood with reference, for example, to any of the following (all of which are incorporated by reference herein in their entireties): U.S. Pat. No. 6,493,541; U.S. patent application Ser. No. 09/825,353; U.S. Pat. No. 6,845,123; U.S. Pat. No. 6,882,847; U.S. Pat. No. 6,757,542; and U.S. Pat. No. 6,590,928.

In the non-limiting illustration of FIG. 1, a radio transmission resource takes the form of a timeslot on a frequency/frequencies provided by a transceiver, with the set of timeslots provided by the transceiver being referred to as a set of resources. It should be appreciated, however, that the above technique (e.g., of changing a call to a circuit switched call when no non-hopping radio transmission resources are available) can be implemented when the radio transmission resources take forms other than timeslots. In this regard, a "radio transmission resource" as utilized herein can take other forms such as (for example) a channel, radio bearer, or subdivision or aspect of a carrier allocated to a call, even in technologies which do not utilize timeslots.

Figure 1A:
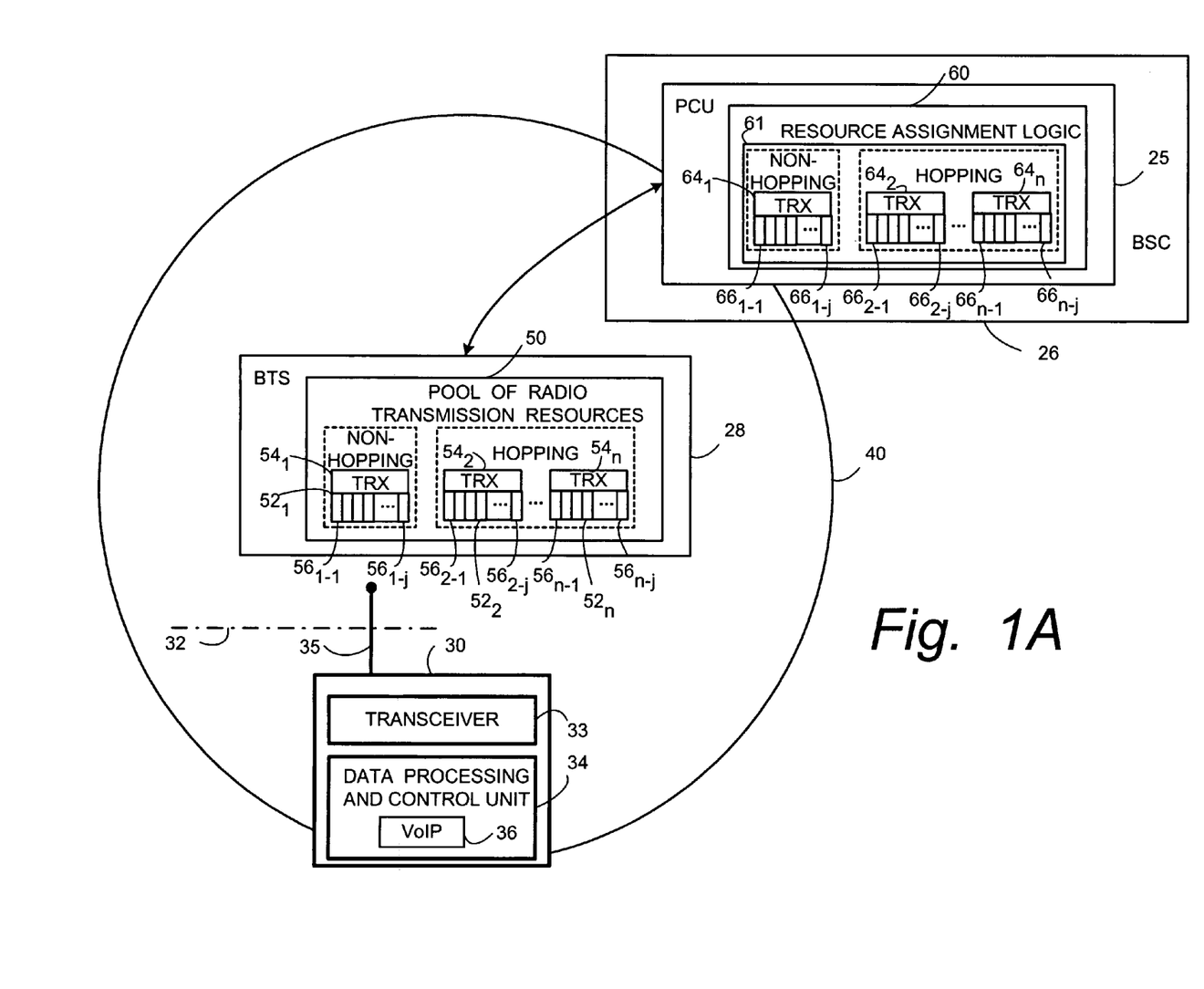
FIG. 1A is a simplifed function block diagram showing a variation of the network of FIG. 1 wherein the packet control unit (PCU) 25 is located at a base station control (BSC) node.
Figure 1B:
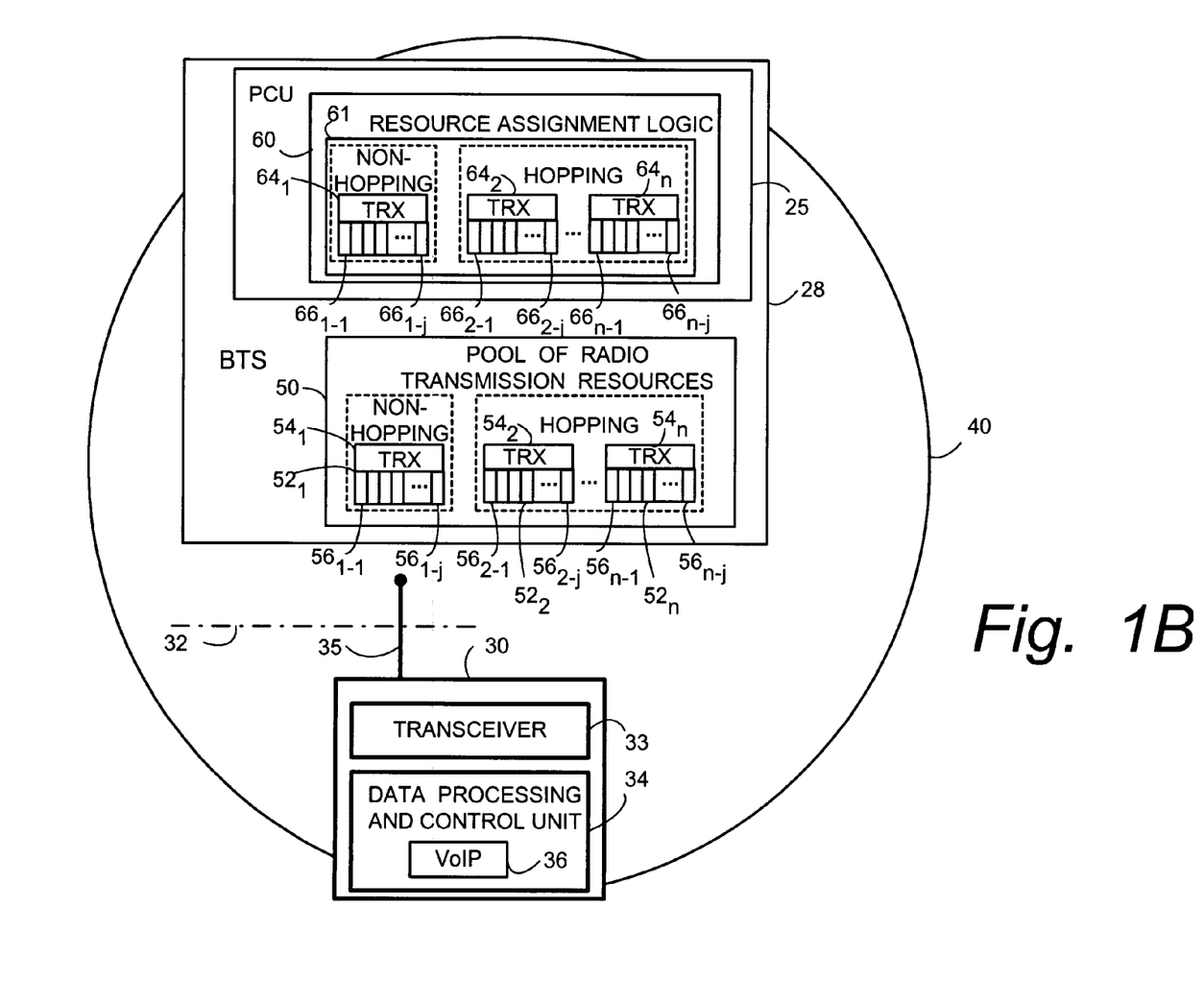
FIG. 1B is a simplifed function block diagram showing a variation of the network of FIG. 1 wherein the packet control unit (PCU) 25 is located at a base transceiver station (BTS).
Figure 1C:
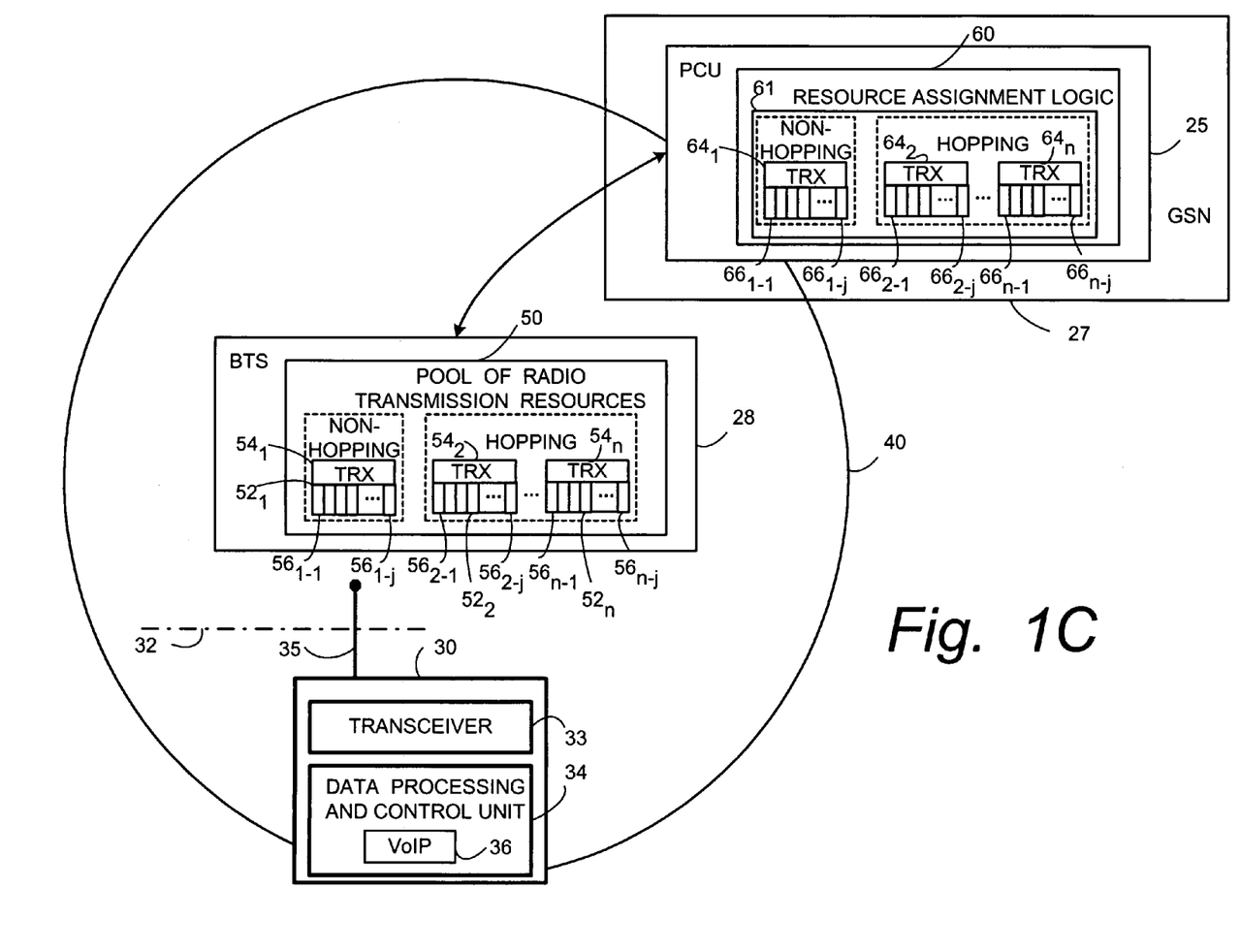
FIG. 1C is a simplifed function block diagram showing a variation of the network of FIG. 1 wherein the packet control unit (PCU) 25 is located at a GPRS Support node (GSN).

The packet control unit (PCU) 25 can be located either entirely or partially at any suitable network node, such as at a base station control (BSC) node 26 as shown in FIG. 1A, a base transceiver station (BTS) or base station node as shown in FIG. 1B, or a GPRS Support node (GSN) 27 as shown in FIG. 1C. By located partially at a node means that the functionality of packet control unit (PCU) 25 can be distributed over two or more nodes.

Figure 4:
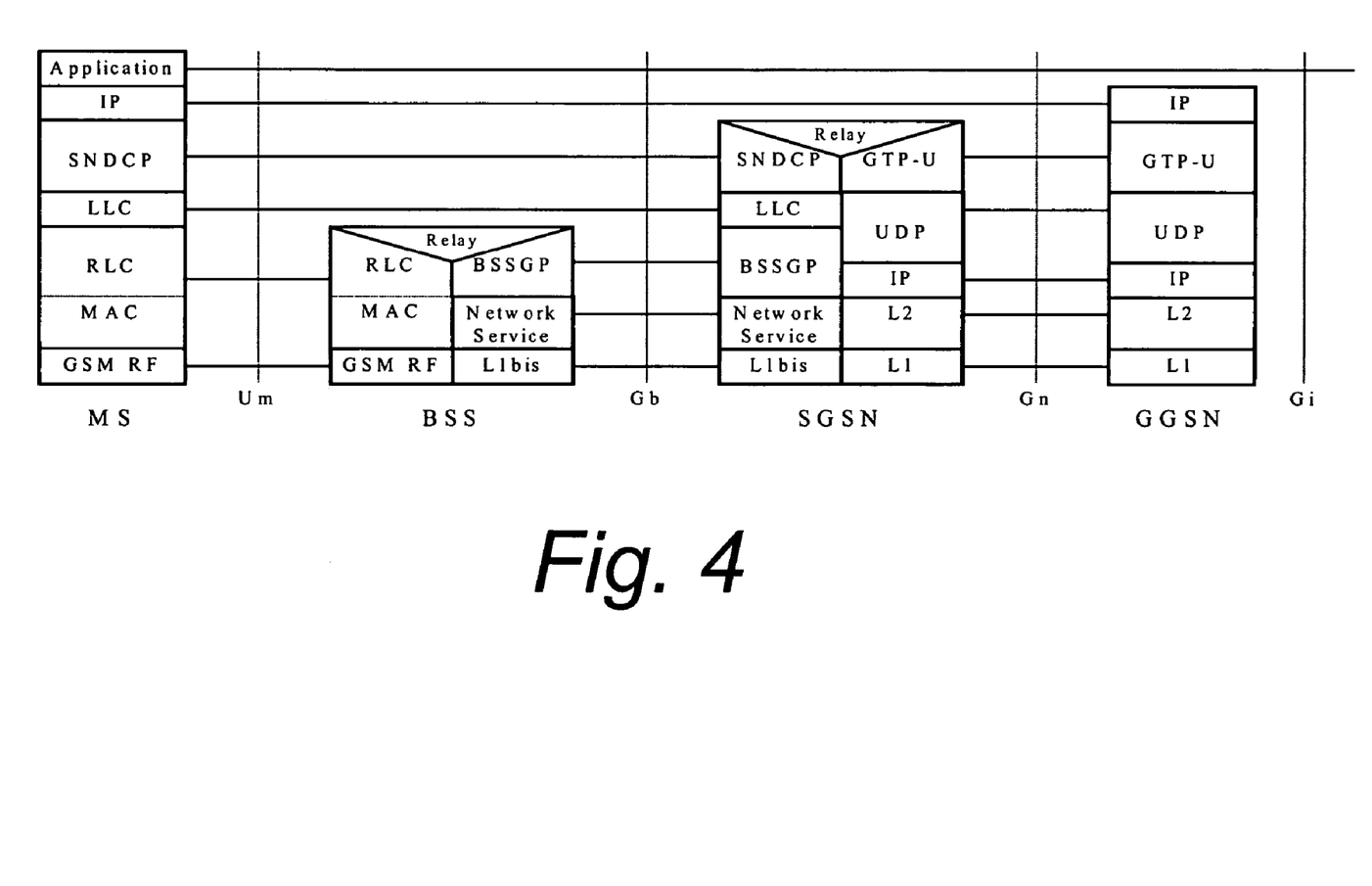
FIG. 4 is a protocol diagram of an EDGE (Enhanced Data Rates for Global Evolution) system.

In an example implementation, the calls comprising voice over internet protocol (VoIP) packet flows are EDGE (Enhanced Data Rates for Global Evolution) VoIP flows. As utilized herein, "EDGE" includes EDGE Evolution, also known, e.g., as EDGE Phase 2. FIG. 4 is a protocol diagram of an EDGE system. In accordance with the method described herein, VoIP EDGE flows are first scheduled on the non-hopping EDGE transceiver. Once the non-hopping EDGE transceiver is full, instead of scheduling the next VoIP user on the hopping EDGE transceiver (where the bandwidth efficiency could be worse than for circuit switched connections), the packet control unit (25) will signal to the mobile station (MS) to perform a packet switched-to-circuit switched handoff. This assumes that the packet control unit (25) can detect or otherwise be notified of a VoIP flow.

Figure 3:
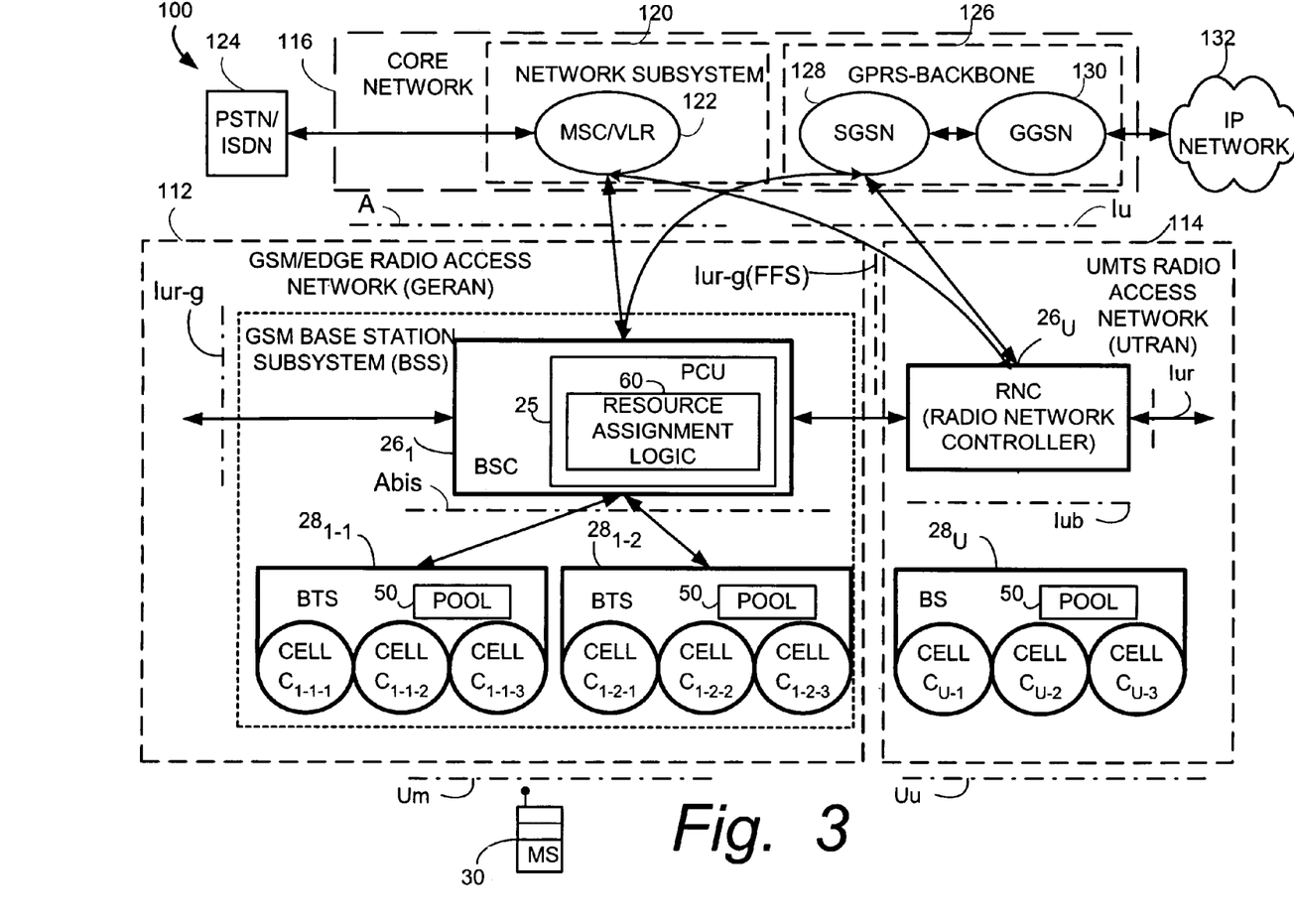
FIG. 3 is diagrammatic view of example telecommunications system in which the present technology may be advantageously employed.

FIG. 3 shows a telecommunications system 100 which provides an example, illustrative context in which the foregoing structure may be found and the foregoing methods may be practiced. The example telecommunications system 100 of FIG. 3 operates in conjunction with both a first radio access network 112 having a first type radio access technology and a second radio access network 114 having a second type radio access technology. In the non-limiting example shown in FIG. 3, the first radio access network 112 uses GSM/EDGE radio access technology (GERAN), while the second radio access network 114 uses UTRAN radio access technology.

Both first radio access network 112 and second radio access network 114 are connected to an external core network(s) 116. The core network(s) 116 include a network subsystem 120 for circuit switched connections, featuring a Mobile Switching Center (MSC) 122 which typically operates in conjunction with registers such as a visitor location register (VLR). The network subsystem 120 is typically connected to (for example) the Public Switched Telephone Network (PSTN) 124 and/or the Integrated Services Digital Network (ISDN).

The core network(s) 116 also include a GPRS/backbone 126 which comprises a serving GPRS service node (SGSN) 128 and a Gateway GPRS support node (GGSN) node 130. The GPRS/backbone 126 is connected to connectionless-oriented external network such as IP Network 132 (e.g., the Internet). Thus, the packet switched connections involve communicating with Serving GPRS Support Node (SGSN) 128 which in turn is connected through a backbone network and Gateway GPRS support node (GGSN) 130 to packet-switched networks 130 (e.g., the Internet, X.25 external networks).

The core network(s) 116 can connect to the first radio access network 12 (e.g., the GERAN) over either an interface known as the A interface, an interface known as the Gb interface, or an open Iu interface, or any combination of these three interfaces. In FIG. 3, it is assumed that the first radio access network is only connected over the Iu interface. The first radio access network 112 includes one or more base station controllers (BSCs) 26, with each base station controller (BSC) 26 controlling one or more base transceiver stations (BTSs) 28. In the example shown in FIG. 3, base station controller (BSC) 26$_1$ is connected across the Abis interface to two base transceiver stations, particularly base transceiver station (BTS) 28$_{1-1}$ and base transceiver station (BTS) 28$_{1-2}$. Each base transceiver station (BTS) 28$_1$ is depicted in FIG. 3 as serving three cells C. Each cell C is represented by a circle proximate the respective base station. Thus, it will be appreciated by those skilled in the art that a base station may serve for communicating across the air interface for more than one cell, and that differing base stations may serve differing numbers of cells.

FIG. 3 also shows that the GERAN typically comprises plural base station controllers (BSCs) 26, although only one of such base station controllers, particularly base station controller (BSC) 26$_1$, is illustrated. For simplicity, details of the base station subsystem (BSS) involving base station controller (BSC) 26$_2$ are omitted. The base station controllers 26 control radio resources and radio connectivity within a set of cells. Each base station (BTS) 28 handles the radio transmission and reception within one or more cells.

The core network 116 also connects to the second radio access network 114 (e.g., the UTRAN radio access network) over an interface know as the Iu interface. The second radio access network 114 includes one or more radio network controllers (RNCs) 26$_U$. For sake of simplicity, the UTRAN 114 of FIG. 1 is shown with only one RNC node. The RNC node 26$_U$ is connected to a plurality of base stations 28$_U$ (e.g., node Bs). In second radio access network (UTRAN network) 114, the radio network controller (RNC) 26$_U$ controls radio resources and radio connectivity within a set of cells, while the base stations handle the radio transmission and reception within one or more cells. The Abis interface, a radio interface Um, the Iu interface, and the other interfaces are shown by dash-dotted lines in FIG. 3.

In the particular non-limiting example described in FIG. 3, the packet control unit (PCU) 25 is situated at the base station controller (BSC) 26 essentially in the manner depicted in FIG. 1A. It will be recalled that packet control unit (PCU) 25 could be located elsewhere, as illustrated by FIG. 1B and FIG. 1C, for example. In accordance with the technique described herein, the base station controller (BSC) 26 can detect or be notified about a VoIP flow. When detected, the packet control unit (PCU) 25 via its resource assignment controller 60 schedules the EDGE VoIP flow on the same transceiver as the BCCH (e.g., transceiver 54$_1$ in the FIG. 1 implementation). When the non-hopping transceiver is completely filled with VoIP flows, the next VoIP flow is not scheduled on the next (e.g., another) transceiver 54. Rather, the call is switched from VoIP to circuit switched. For example, a message is sent from the base station controller (BSC) 26 to the mobile station (MS) 30 in the form of a "PS-to-CS HO Command". The mobile station (MS) 30 will perform a PS-to-CS handover and re-attach the call as a circuit switch call (on a hopping resource, e.g., a hopping transceiver).

In view of the techniques herein provided, higher hardware efficiency is achieved, i.e. more phone calls can be served, with the same number of basestations/transceivers.

As mentioned previously, at the start or introduction of VoIP, each user upgrading from an old circuit switched phone to a VoIP phone will bring a benefit for the operator in terms of increased hardware efficiency. With the techniques herein provided, even though the non-hopping transmission resources may become filled, there will be no penalty in terms of decreased hardware efficiency, even if VoIP penetration continues to increase beyond that point.

If the user can be more efficiently served in the packet switched domain, that user will be served in the PS domain. If the user can be more efficiently served in the circuit switched domain, that user will be served in the circuit switched domain.

Thus, the packet control unit (PCU) 25 with its resource assignment controller 60 as herein described connects the hopping vs. non-hopping resource selection with a decision to make a PS-to-CS handoff, specifically for EDGE VoIP flows (e.g., as detected by the base station controller (BSC) 26).

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A method of operating a telecommunications network comprising:
   configuring at least one set of radio transmission resources of a cell as a non-hopping set of radio transmission resources;
   configuring other sets of radio transmission resources of the cell as hopping sets of radio transmission resources;
   scheduling calls comprising voice over internet protocol packet flows on the non-hopping set of radio transmission resources in accordance with capacity of the non-hopping set of radio transmission resources;
   determining whether the non-hopping set of radio transmission resources lacks capacity for a further call with a mobile station by determining whether any non-hopping resource is currently available for allocation to the new call; and
   when the non-hopping set of radio transmission resources lacks capacity for the further call with a mobile station, requesting that the further call be changed from a voice over internet protocol packet flow to a circuit switched connection hopping resource of the cell.

2. The method of claim 1, wherein the non-hopping set of radio transmission resources comprise radio transmission resources provided by a non-hopping transceiver and wherein the radio transmission resources provided by the non-hopping transceiver comprise timeslots on a frequency upon which the non-hopping transceiver operates, and wherein the hopping sets of radio transmission resources comprise radio transmission resources provided by respective hopping transceivers and wherein the radio transmission resources provided by the hopping transceivers comprise timeslots on respective frequencies upon which the hopping transceivers operate.

3. The method of claim 1, further comprising utilizing at least one radio transmission resource of the non-hopping set of radio transmission resources for a broadcast control channel (BCCH), and using other radio transmission resources of the non-hopping set of radio transmission resources for the calls comprising voice over internet protocol packet flows.

4. The method of claim 1, wherein requesting that the further call be changed from the voice over internet protocol packet flow to the circuit switched connection comprises requesting the mobile station to perform a packet-switch to circuit-switch handover and thereby reattach the call as a circuit switch call on one of the hopping sets of radio transmission resources of the cell.

5. The method of claim 1, wherein the hopping sets of radio transmission resources have higher reuse among other cells of the network than the non-hopping set of radio transmission resources.

6. The method of claim 1, wherein the calls comprising voice over internet protocol packet flows comprise EDGE VoIP flows.

7. The method of claim 1, further comprising changing the further call to a hopping radio transmission resource of the cell.

8. The method of claim 3, further comprising utilizing at least one timeslot of the non-hopping set of radio transmission resources for a broadcast control channel (BCCH), and using other timeslots of the non-hopping set of radio transmission resources for the calls comprising voice over internet protocol packet flows.

9. A method of operating a telecommunications network comprising:
configuring a transmitter with radio transmission resources including at least one radio transmission resource for a broadcast control channel (BCCH);
scheduling calls comprising voice over internet protocol packet flows on the radio transmission resources of the transmitter in accordance with capacity of the transmitter;
determining whether a non-hopping set of radio transmission resources lacks capacity for a further call with a mobile station by determining whether any non-hopping resource is currently available for allocation to the further call; and
when the transmitter having the radio transmission resource for the broadcast control channel (BCCH) lacks capacity for the further call with a mobile station, requesting that the further call be changed from a voice over internet protocol packet flow to a circuit switched connection hopping radio transmission resource of the cell.

10. The method of claim 9, wherein the radio transmission resources of the transmitter comprise non-hopping resources, and further comprising utilizing at least one timeslot of the non-hopping radio transmission resources for the broadcast control channel (BCCH), and using other timeslots of the non-hopping radio transmission resources for the calls comprising voice over internet protocol packet flows.

11. The method of claim 9, wherein requesting that the further call be changed from the voice over internet protocol packet flow to the circuit switched connection comprises requesting the mobile station to perform a packet-switch to circuit-switch handover and thereby reattach the call as a circuit switch call other radio transmission resources.

12. The method of claim 9, further comprising changing the further call to a hopping radio transmission resource of the cell.

13. A telecommunications network comprising:
a base station node configured to provide plural sets of radio transmission resources for communicating with mobile stations in a cell, at least one set of radio transmission resources of the cell being a non-hopping set of radio transmission resources and other sets of radio transmission resources of the cell being hopping sets of radio transmission resources;
a packet control unit configured to schedule calls comprising voice over internet protocol packet flows on the non-hopping sets of radio transmission resources in accordance with capacity of the non-hopping set of radio transmission resources; to determine whether a non-hopping set of radio transmission resources lacks capacity for a further call with a mobile station by determining whether any non-hopping resource is currently available for allocation to the further call; and which, when the non-hopping set of radio transmission resources lacks capacity for a further call with a mobile station, to request that the further call be changed from a voice over internet protocol packet flow to a circuit switched connection hopping resource of the cell.

14. The apparatus of claim 13, wherein the non-hopping set of radio transmission resources comprise radio transmission resources provided by a non-hopping transceiver and wherein the radio transmission resources provided by the non-hopping transceiver comprise timeslots on a frequency upon which the non-hopping transceiver operates, and wherein the hopping sets of radio transmission resources comprise radio transmission resources provided by respective hopping transceivers and wherein the radio transmission resources provided by the hopping transceivers comprise timeslots on respective frequencies upon which the hopping transceivers operate.

15. The apparatus of claim 13, wherein the packet control unit is configured to utilize at least one radio transmission resource of the non-hopping set of radio transmission resources for a broadcast control channel (BCCH), and the packet control unit is configured to utilize other radio transmission resources of the non-hopping set of radio transmission resources for the calls comprising voice over internet protocol packet flows.

16. The apparatus of claim 15, wherein the packet control unit is further configured to utilize at least one timeslot of the non-hopping set of radio transmission resources for a broadcast control channel (BCCH), and wherein the packet control unit is configured to utilize other timeslots of the non-hopping set of radio transmission resources for the calls comprising voice over internet protocol packet flows.

17. The apparatus of claim 13, wherein, to request that the further call be changed from a voice over internet protocol packet flow to a circuit switched connection, the packet control unit is configured to request the mobile station to perform a packet-switch to circuit-switch handover and thereby reattach the further call as a circuit switch call on one of the hopping sets of radio transmission resources of the cell.

18. The apparatus of claim 13, wherein the hopping sets of radio transmission resources have higher reuse among other cells of the network than the non-hopping set of radio transmission resources.

19. The apparatus of claim 13, wherein the calls comprising voice over internet protocol packet flows comprise EDGE VoIP flows.

20. The apparatus of claim 13, wherein the packet control unit is at least partially situated at a base station controller node.

21. The apparatus of claim 13, wherein the packet control unit is at least partially situated at a base station node.

22. The apparatus of claim 13, wherein the packet control unit is at least partially situated at a GPRS Support Node.

23. A packet control unit for a telecommunications network which comprises plural sets of radio transmission resources for communicating with mobile stations in a cell, at least one set of radio transmission resources of the cell being a non-hopping set of radio transmission resources and other sets of radio transmission resources of the cell being hopping sets of radio transmission resources, and wherein the packet control unit is arranged to schedule calls comprising voice over internet protocol packet flows on the non-hopping sets of radio transmission resources in accordance with capacity of the non-hopping set of radio transmission resources; to determine whether a non-hopping set of radio transmission resources lacks capacity for a further call with a mobile station by determining whether any non-hopping resource is currently available for allocation to the further call; and when the non-hopping set of radio transmission resources lacks capacity for a further call with a mobile station, to request that the further call be changed from a voice over internet protocol packet flow to a circuit switched connection hopping resource of the cell.

24. The apparatus of claim 23, wherein the non-hopping set of radio transmission resources comprise radio transmission resources provided by a non-hopping transceiver and wherein the radio transmission resources provided by the non-hopping transceiver comprise timeslots on a frequency upon which the non-hopping transceiver operates, and wherein the hopping sets of radio transmission resources comprise radio transmission resources provided by respective hopping transceivers and wherein the radio transmission resources provided by the hopping transceivers comprise timeslots on respective frequencies upon which the hopping transceivers operate.

25. The apparatus of claim 23, wherein the packet control unit is configured to utilize at least one radio transmission resource of the non-hopping set of radio transmission resources for a broadcast control channel (BCCH), and the packet control unit is configured to utilize other radio transmission resources of the non-hopping set of radio transmission resources for the calls comprising voice over internet protocol packet flows.

26. The apparatus of claim 23, wherein, to request that the further call be changed from a voice over internet protocol packet flow to a circuit switched connection, the packet control unit is configured to request the mobile station to perform a packet-switch to circuit-switch handover and thereby reattach the further call as a circuit switch call on one of the hopping sets of radio transmission resources of the cell.

27. The apparatus of claim 23, wherein the hopping sets of radio transmission resources have higher reuse among other cells of the network than the non-hopping set of radio transmission resources.

28. The apparatus of claim 23, wherein the calls comprising voice over internet protocol packet flows comprise EDGE VoIP flows.

29. The apparatus of claim 23, wherein the packet control unit is at least partially situated at a base station controller node.

30. The apparatus of claim 23, wherein the packet control unit is at least partially situated at a base station node.

31. The apparatus of claim 23, wherein the packet control unit is at least partially situated at a GPRS Support Node.

32. The apparatus of claim 25, wherein the packet control unit is further configured to utilize at least one timeslot of the non-hopping set of radio transmission resources for a broadcast control channel (BCCH), and wherein the packet control unit is configured to utilize other timeslots of the non-hopping set of radio transmission resources for the calls comprising voice over internet protocol packet flows.

* * * * *

UNITED STATES PATENT AND TRADEMARK OFFICE
CERTIFICATE OF CORRECTION

| | | |
|---|---|---|
| PATENT NO. | : 7,970,400 B2 | Page 1 of 1 |
| APPLICATION NO. | : 11/298939 | |
| DATED | : June 28, 2011 | |
| INVENTOR(S) | : Larsson et al. | |

It is certified that error appears in the above-identified patent and that said Letters Patent is hereby corrected as shown below:

On Title Page 2, Item (56), under "OTHER PUBLICATIONS", Line 3, delete "Inter'" and insert -- Inter'l --, therefor.

In Fig. 3, Sheet 6 of 8, for Tag "$28_U$", Line 1, delete "BS" and insert -- BTS --, therefor.

In Column 1, Line 15, delete ""SCHDULING" and insert -- "SCHEDULING --, therefor.

In Column 2, Line 62, delete "TRXsSo," and insert -- TRXs. So, --, therefor.

In Column 4, Line 19, delete "of is" and insert -- of --, therefor.

In Column 4, Line 50, delete "simplifed" and insert -- simplified --, therefor.

In Column 4, Line 53, delete "simplifed" and insert -- simplified --, therefor.

In Column 4, Line 56, delete "simplifed" and insert -- simplified --, therefor.

In Column 5, Line 35, delete "explicity" and insert -- explicitly --, therefor.

In Column 6, Line 18, delete "$54_2$-$52_1$" and insert -- $54_2$-$52_n$ --, therefor.

In Column 7, Line 16, delete "check" and insert -- check of --, therefor.

Signed and Sealed this
Twentieth Day of March, 2012

David J. Kappos
*Director of the United States Patent and Trademark Office*